June 11, 1929.  D. E. KELLOGG  1,716,641
CONDUIT FITTING
Filed Sept. 26, 1925
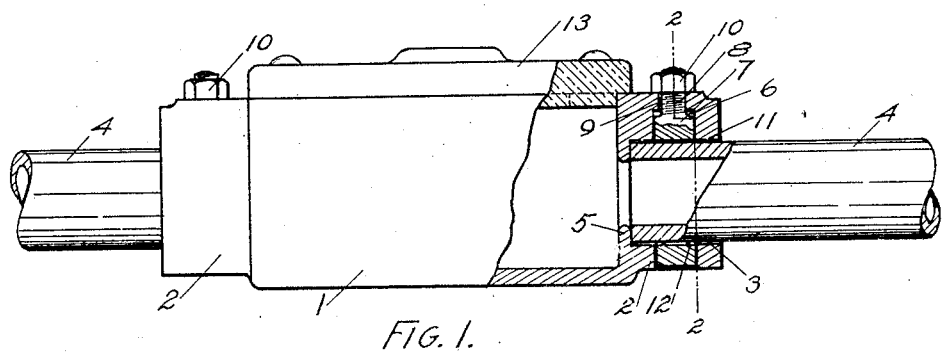
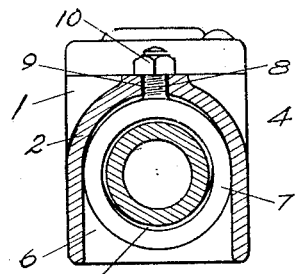
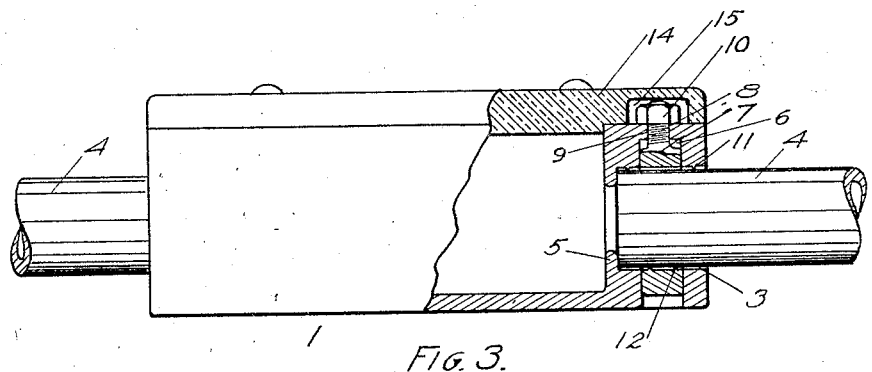
INVENTOR.
Dorcey E. Kellogg
BY
ATTORNEYS.

Patented June 11, 1929.

1,716,641

UNITED STATES PATENT OFFICE.

DORCEY E. KELLOGG, OF ERIE, PENNSYLVANIA, ASSIGNOR TO ERIE MALLEABLE IRON COMPANY, OF ERIE, PENNSYLVANIA, A CORPORATION OF PENNSYLVANIA.

CONDUIT FITTING.

Application filed September 26, 1925. Serial No. 58,937.

This invention is designed to improve conduit fittings, particularly such fittings as are designed to receive threadless conduits.

The invention is illustrated in the accompanying drawings as follows:—

Fig. 1 shows a side elevation, partly in section.

Fig. 2 is a section on the line 2—2 in Fig. 1.

Fig. 3 is a side elevation of a construction varying slightly from that of Fig. 1.

1 marks the body of the fitting. This is provided with a conduit extension 2 having a conduit-receiving opening 3. A conduit 4 is adapted to extend into the opening 3 against a guard shoulder 5.

A transverse slot 6 extends around the opening 3, opening through the walls of the fitting at the bottom and a ring 7 is arranged in this slot and adapted to receive the conduit as it is inserted in the opening 3.

The ring has a screw 8 which extends through an opening 9 in the wall of the extension and a nut 10 is provided for drawing a screw across the opening, or into a position eccentric to the conduit so as to clamp the same.

The conduit opening is provided with the indenting ribs 11 at the side engaged by the conduit and the ring is provided with similar ribs 12 at the side of the ring engaging the conduit.

In Fig. 1 the cover 13 does not protrude over the extension 2 while in Fig. 3 the cover 14 is sufficiently long to house the nut 10, the cover being provided with a cavity 15 to receive the nut.

It will readily be seen that this forms a very convenient means for clamping a conduit and that the engagement of the conduit may be made very secure.

What I claim as new is:—

In a conduit fitting, the combination of a body having a conduit receiving opening and a transverse slot extending from and around the opening; a clamping ring in the slot; said ring having an internal diameter approximating the diameter of the opening, and means forcing the ring in a direction across the opening to clamp an inserted conduit.

In testimony whereof I have hereunto set my hand.

DORCEY E. KELLOGG.